United States Patent
Augé et al.

(10) Patent No.: US 12,328,265 B2
(45) Date of Patent: Jun. 10, 2025

(54) NETWORK FLOW DIFFERENTIATION USING A LOCAL AGENT

(71) Applicant: Cisco Technology, Inc., San Jose, CA (US)

(72) Inventors: Jordan François Jean Augé, Saint-Cyr-I-Ecole (FR); Jacques Olivier Samain, Paris (FR)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 17/666,689

(22) Filed: Feb. 8, 2022

(65) Prior Publication Data
US 2023/0254258 A1    Aug. 10, 2023

(51) Int. Cl.
*H04L 47/2483* (2022.01)
*H04L 45/74* (2022.01)

(52) U.S. Cl.
CPC .......... *H04L 47/2483* (2013.01); *H04L 45/74* (2013.01)

(58) Field of Classification Search
None
See application file for complete search history.

(56) References Cited

U.S. PATENT DOCUMENTS

| | | |
|---|---|---|
| 8,264,965 B2 | 9/2012 | Dolganow et al. |
| 8,726,007 B2 | 5/2014 | Chandrika |
| 9,071,542 B2 | 6/2015 | Jackowski et al. |
| 9,473,410 B2 | 10/2016 | Marchetti |
| 9,634,945 B2 | 4/2017 | Stevens et al. |
| 2006/0092963 A1 * | 5/2006 | Bakre ............. H04L 65/80 370/465 |
| 2009/0033739 A1 * | 2/2009 | Sarkar ............. H04N 7/152 348/14.09 |
| 2009/0257739 A1 * | 10/2009 | Kanada ............. H04L 47/10 386/241 |
| 2012/0063329 A1 * | 3/2012 | Gnanasekaran .... H04L 43/0823 370/248 |
| 2014/0112189 A1 * | 4/2014 | Abraham ............. H04W 8/18 370/254 |
| 2015/0222549 A1 * | 8/2015 | Kakadia ............. H04L 47/283 370/231 |
| 2015/0350010 A1 * | 12/2015 | Yang ............. H04L 41/0883 709/220 |
| 2020/0396636 A1 * | 12/2020 | Cheng ............. H04W 28/24 |
| 2021/0058827 A1 * | 2/2021 | Holmström ....... H04W 28/0263 |
| 2022/0103477 A1 * | 3/2022 | Peng ............. H04L 45/306 |
| 2022/0369153 A1 * | 11/2022 | Manja Ppallan . H04W 28/0268 |

FOREIGN PATENT DOCUMENTS

WO    WO-2013095517 A1 *    6/2013    ............. H04L 69/08

* cited by examiner

*Primary Examiner* — Benjamin Lamont
(74) *Attorney, Agent, or Firm* — BEHMKE INNOVATION GROUP LLC; James M. Behmke; James J. Wong

(57) ABSTRACT

In one embodiment, an agent executed by a device receives a packet generated by an application executed by the device that includes a flow profile identifier. The agent determines one or more adjustments to the packet based in part by matching the flow profile identifier of the packet to a flow profile for the application. The agent forms an adjusted packet by applying the one or more adjustments to the packet. The agent sends the adjusted packet to an external destination via a network.

20 Claims, 8 Drawing Sheets

NETWORK FLOW DIFFERENTIATION USING A LOCAL AGENT

TECHNICAL FIELD

The present disclosure relates generally to computer networks, and, more particularly, to network flow differentiation using a local agent.

BACKGROUND

Generally, applications executing on a device, for example a cellphone, tablet, laptop, etc., are not configured to detail how one or more network flows (e.g., communication traffic) from a given application is to be treated in a communication network. Even more, a given application may provide a plurality of functions, features, etc. that each may require varying level of prioritization, treatment, etc. Differentiated services code point (DSCP) marking provides a technique for classifying and managing network flows. However, DSCP marking schemes are coarse and limited in that Quality of Service treatment, provided using DSCP marking, might not directly correlate to an increase in general quality expectations for an application (i.e., Quality of Experience (QoE)) that has its traffic marked with DSCP.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
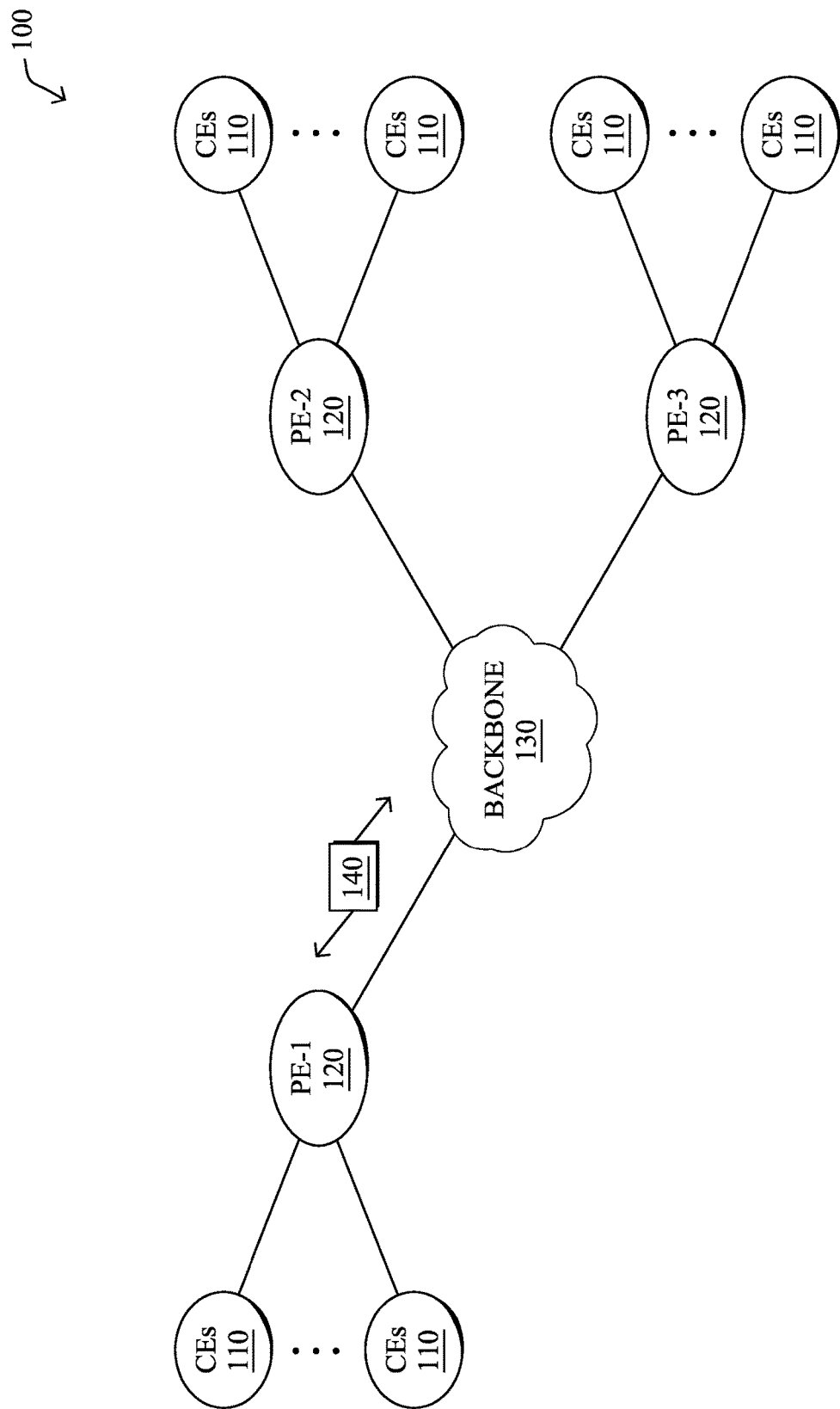
FIGS. 1A-1B illustrate an example communication network.

According to one or more embodiments of the disclosure, an agent executed by a device receives a packet generated by an application executed by the device, where the packet includes a flow profile identifier. The agent determines one or more adjustments to the packet based in part by matching the flow profile identifier of the packet to a flow profile for the application. The agent then forms an adjusted packet by applying the one or more adjustments to the packet. The agent sends the adjusted packet to an external destination via a network.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network by the CE router via two primary links (e.g., from different Service Providers), with potentially a backup link (e.g., a 3G/4G/5G/LTE connection). A site of type B may itself be of different types:

2a.) Site Type B1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
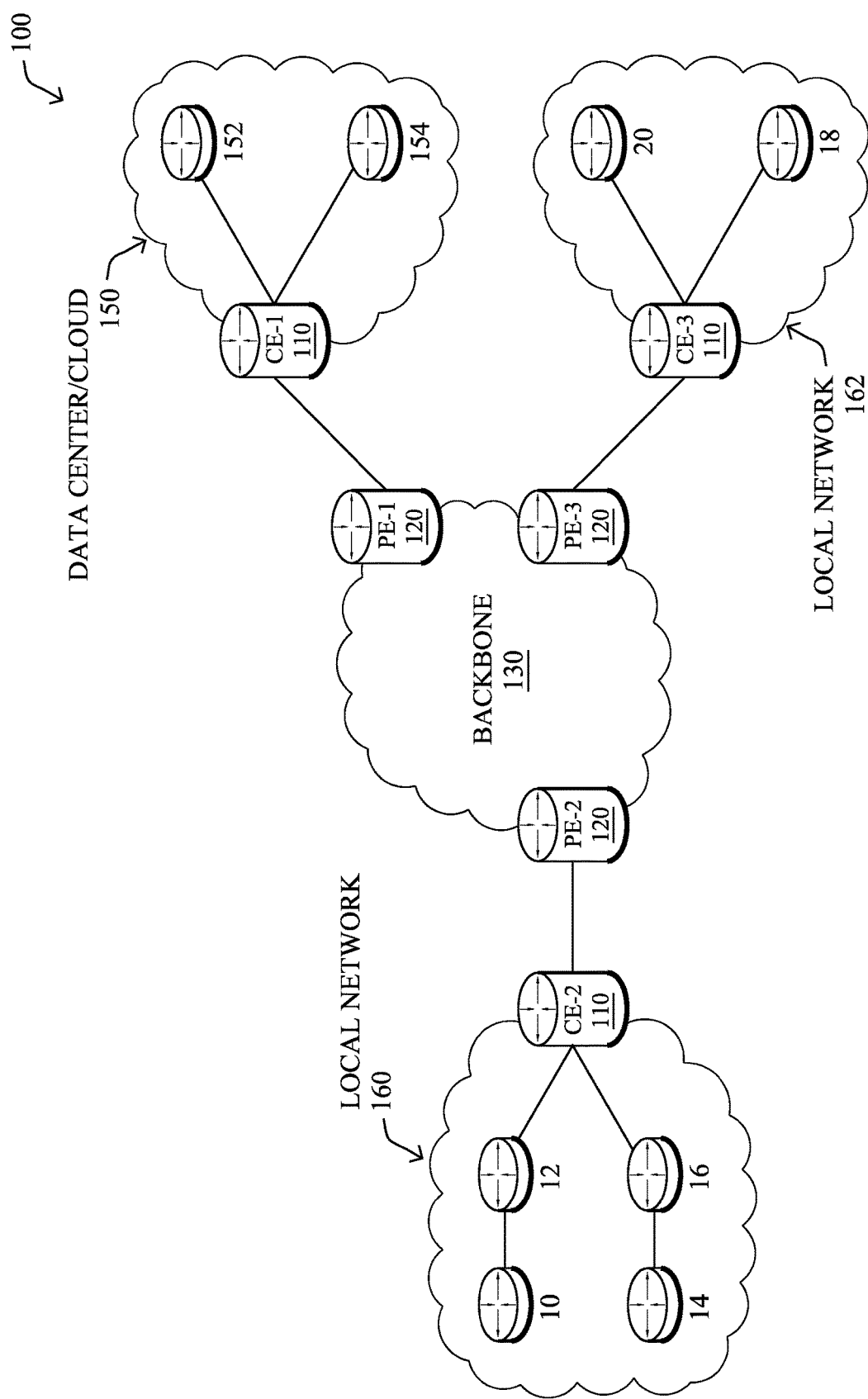

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

According to various embodiments, a software-defined WAN (SD-WAN) may be used in network 100 to connect local network 160, local network 162, and data center/cloud environment 150. In general, an SD-WAN uses a software defined networking (SDN)-based approach to instantiate tunnels on top of the physical network and control routing decisions, accordingly. For example, as noted above, one tunnel may connect router CE-2 at the edge of local network 160 to router CE-1 at the edge of data center/cloud environment 150 over an MPLS or Internet-based service provider network in backbone 130. Similarly, a second tunnel may also connect these routers over a 4G/5G/LTE cellular service provider network. SD-WAN techniques allow the WAN functions to be virtualized, essentially forming a virtual connection between local network 160 and data center/cloud environment 150 on top of the various underlying connections. Another feature of SD-WAN is centralized management by a supervisory service that can monitor and adjust the various connections, as needed.

Figure 2:
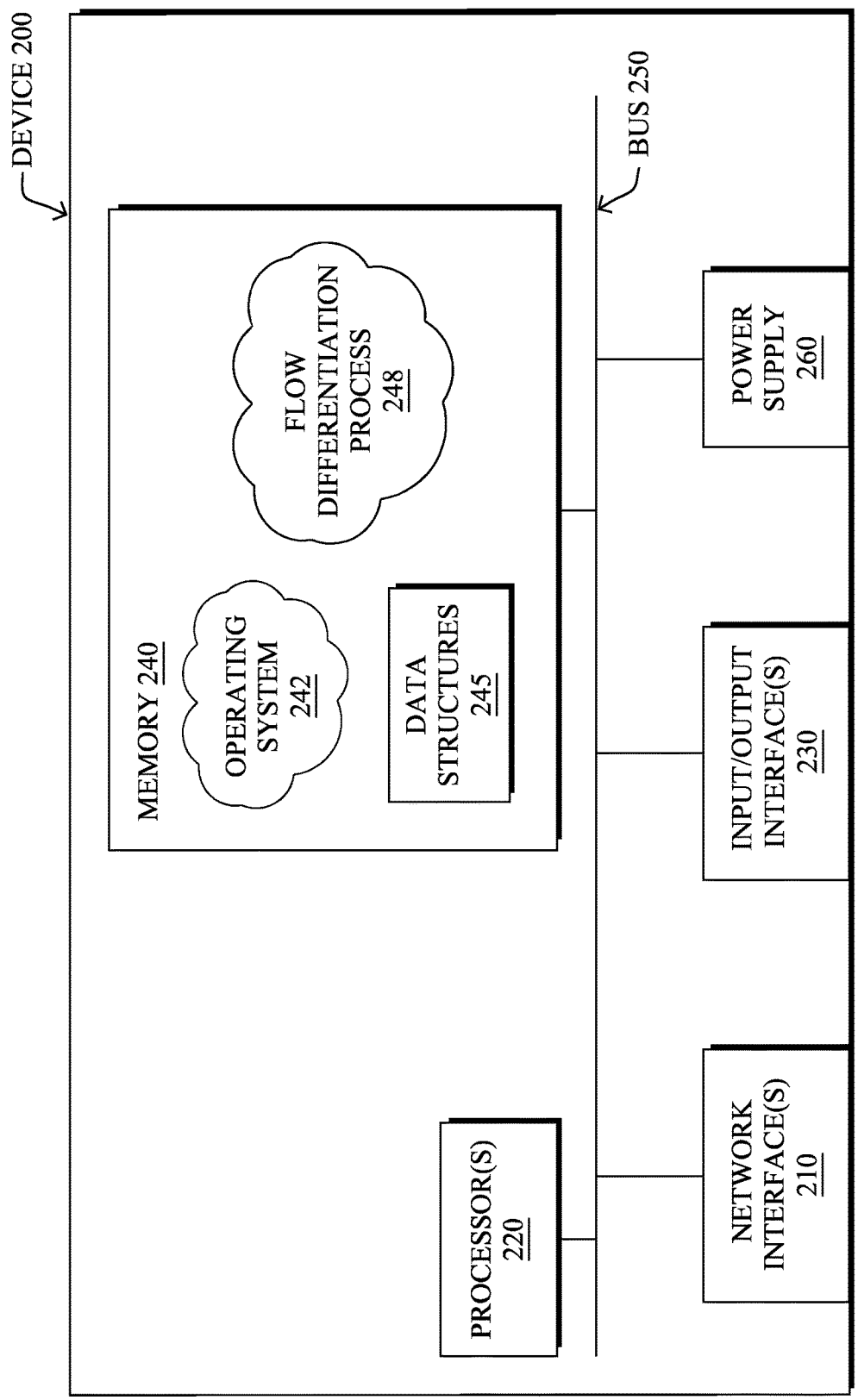
FIG. 2 illustrates an example network device/node.

FIG. 2 is a schematic block diagram of an example node/device 200 (e.g., an apparatus) that may be used with one or more embodiments described herein, e.g., as any of the computing devices shown in FIGS. 1A-1B, particularly the PE routers 120, CE routers 110, nodes/device 10-20, servers 152-154 (e.g., a network controller/supervisory service located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

Depending on the type of device, other interfaces, such as input/output (I/O) interfaces 230, user interfaces (UIs), and so on, may also be present on the device. Input devices, in particular, may include an alpha-numeric keypad (e.g., a keyboard) for inputting alpha-numeric and other information, a pointing device (e.g., a mouse, a trackball, stylus, or cursor direction keys), a touchscreen, a microphone, a camera, and so on. Additionally, output devices may include speakers, printers, particular network interfaces, monitors, etc.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise flow differentiation process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

As noted above, from the perspective of an endpoint device (e.g., cellphone, tablet, laptop, etc.), a given application executing on the endpoint is generally not configured to detail how one or more network flows (e.g., communication traffic) from the application is to be treated in a communication network (e.g., from the endpoint device, through a plurality of local networks, the Internet, etc., all the way to the one or more network flows ultimate destination). For example, a videoconferencing application may be configured to merely communicate videoconference data using an endpoint device's operating system level communications software and/or hardware, without the ability to express one or more detailed flow treatment policies for videoconference data. Even more, a given application may provide a plurality of functions, features, etc. that each may require varying level of prioritization, treatment, etc. In the case of a videoconferencing application, it may communicate both text-based messaging data that may not require a high level of service as well as audio/video data that does.

Of note, Quality of Service (QoS) differentiated services code point (DSCP) marking provides a technique for classifying and managing network flows, but many devices that are used to communicate a given network flow are purposely configured to ignore DSCP markings due trust issues. Even in cases where trust may be guaranteed (e.g., using an enterprise-based application), DSCP marking schemes are coarse and limited in that QoS treatment (provided using DSCP marking) might not directly correlate to an increase in general quality expectations for an application (i.e., Quality of Experience (QoE)) that has its traffic marked with DSCP. Additionally, other approaches from the perspective of the endpoint device are problematic. For instance, non-collaborative approaches, such as tuple-based flow identification, deep packet inspection (DPI), or domain name system-based identification may be complex, not resilient to changes, and/or coarse. Collaborative approaches, such as DSCP described above, flow labeling, etc. are limited and rely on in-band communication.

Network Flow Differentiation Using a Local Agent

The techniques herein introduce mechanisms for network flow differentiation using a local agent of a device, where the local agent may be configured to mark network packets (for a given application of the device), potentially at an individual packet level, with various flow profile identifiers. Other a posteriori-based solutions, for example, deep packet inspection (DPI) are challenging and costly in terms of network resources, especially in light of the ubiquity of packet encryption. The local agent of the techniques described herein, on the other hand, may be executed by a device, along with or as part of an application, so as to provide optimal guarantees for network flows, traffic, etc. of the application based on one or more profiles (that may be stored a cloud computing environment and defined, in part, by stakeholders of the application). In order to bring Quality of Experience (QoE) improvements to various flows of a particular application executed on a device (e.g., flows that need to be treated with high priority versus flows that do not), deploying the local agent may be done, for example, within a native quality-aware network stack of the device, by a transparent sidecar proxy, etc. That is, a flexible architecture is described herein that allows the application to cooperate and communicate a particular flow profile (of a plurality) for a given network flow of the application to the network stack or to the local agent (responsible for handling network traffic of the application). Based on the particular flow profile, network devices in the network stack along a path of the given flow may treat the given network flow accordingly.

Illustratively, the techniques described herein may be performed by hardware, software, and/or firmware, such as in accordance with flow differentiation process 248, which may include computer executable instructions executed by the processor 220 (or independent processor of interfaces 210) to perform functions relating to the techniques described herein.

Specifically, according to various embodiments, an agent executed by a device receives a packet generated by an application executed by the device that includes a flow profile identifier. The agent determines one or more adjustments to the packet based in part by matching the flow profile identifier of the packet to a flow profile for the application. The agent forms an adjusted packet by applying the one or more adjustments to the packet. The agent sends the adjusted packet to an external destination via a network.

Operationally, FIGS. 3A-3D illustrates an example architecture for network flow differentiation using a local agent, where architecture 300 may include an endpoint device 302 and a destination device 304. Endpoint device 302 may comprise any end user computing device which a user may use to communicate with destination device 304, for example, a cellphone, tablet, laptop, cellphone, etc. Endpoint device 302, as shown, may comprise operating system 306, application(s) 308, and agent 310 that is local to endpoint device 302. Of note, operating system 306 may be configured as described above with respect to operating system 242 of FIG. 2, where operating system 306 may manage network communications, input/output, etc. of endpoint device 302. Application(s) 308 of endpoint device 302 may comprise applications that may be executed on endpoint device 302 (along with operating system 306), for example, a videoconference application, a multimedia application, a gaming application, etc. that communicate one or more network flows which travel over paths comprising networking device(s) 312 to destination device(s) 314. It is to be understood that each of these applications may send out various network flows that each require varying degrees of prioritization, treatment, etc. Generally, destination device(s) 314 may comprise computing resources, data storage, etc. that application(s) 308 may access or use during execution. Furthermore, in an embodiment, it is contemplated that application(s) 308 may comprise a native application to the endpoint device 302 that is enabled may communicate with a networking stack (e.g., of operating system 306). In this embodiment, the native application may be configured itself to operate as agent 310.

Figure 3A:
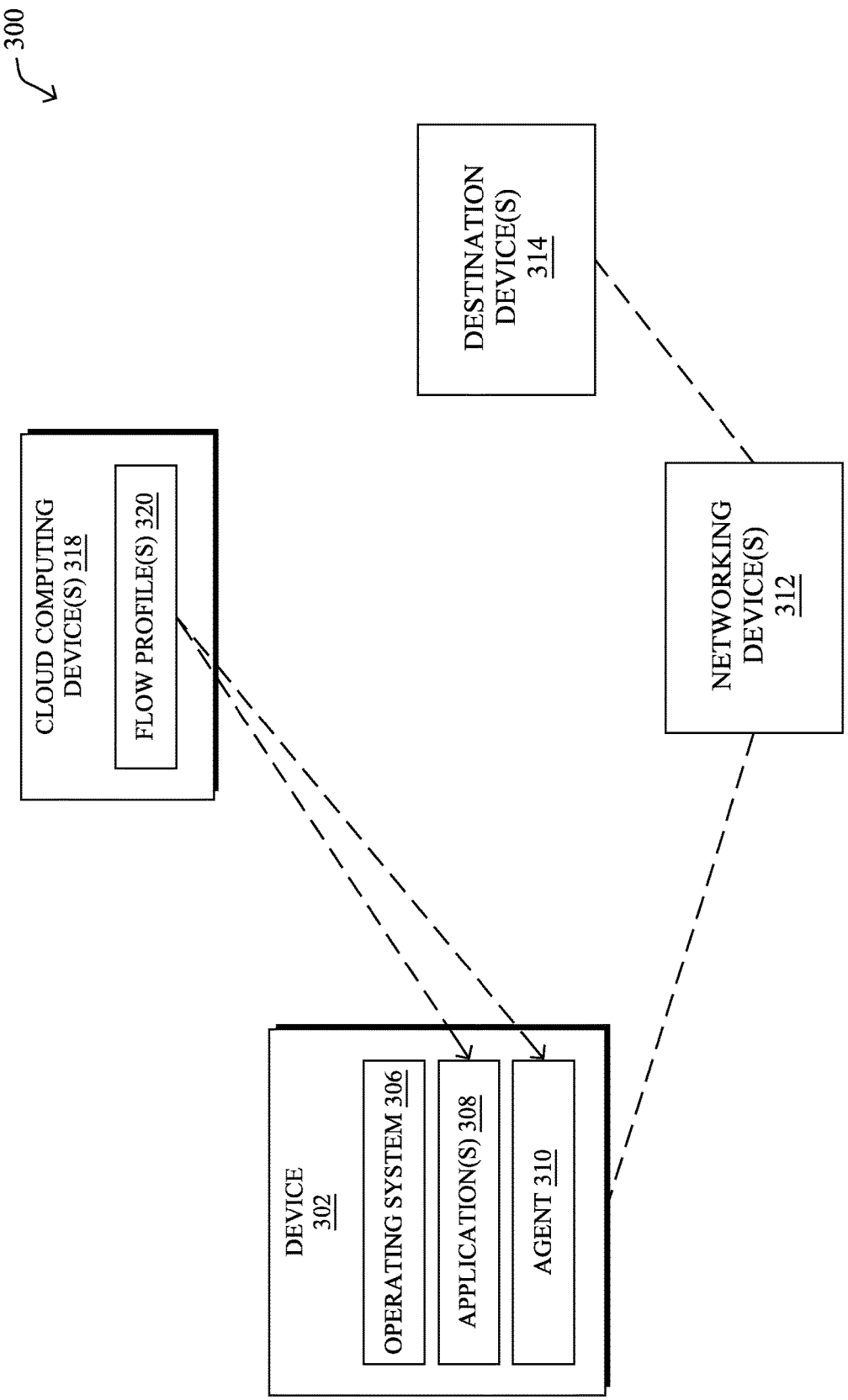
FIGS. 3A-3D illustrate an example architecture for network flow differentiation using a local agent.

In addition, architecture 300 comprises cloud computing device(s) 316 that, as shown in FIG. 3A, is configured to store one or more flow profiles 320 that may be defined and specified by end users, managers/stakeholders, etc. of application(s) 308. One or more flow profiles 320 may be unique to a particular application and include one or more flow treatment policies for network flow, traffic, packets, etc. generated (or caused to be generated) by the application. One or more flow profiles 320 may include definitions and/or requirements, as will be described in greater detail herein below, for how profile identifications are to be determined (by application(s) 308 and/or agent 310). A particular profile for an application may define how various network traffic output by the application is to be treated. For instance, a profile for a gaming application may require that data related to a user's gaming experience is prioritized for as soon as possible delivery service, while data related to chat/text messages is de-prioritized.

Such definitions and/or requirements may be summarized as compact class identifiers that application(s) 308 are configured to set. It is contemplated that DSCP fields, for network packets associated with application(s) 308, may be overloaded using varying "semantics." Additionally, each of one or more flow profiles 320 may be maintained or managed by cloud computing device(s) 316 such that associated corresponding profiler identifiers that are unique for application(s) are created. In the case of a proxy-based deployment (e.g., agent 310) for network flow differentiation, each of application(s) 308 and agent 310 are configured to retrieve profile mappings of one or more flow profiles 320 subsequent to the profiles being defined.

Figure 3B:
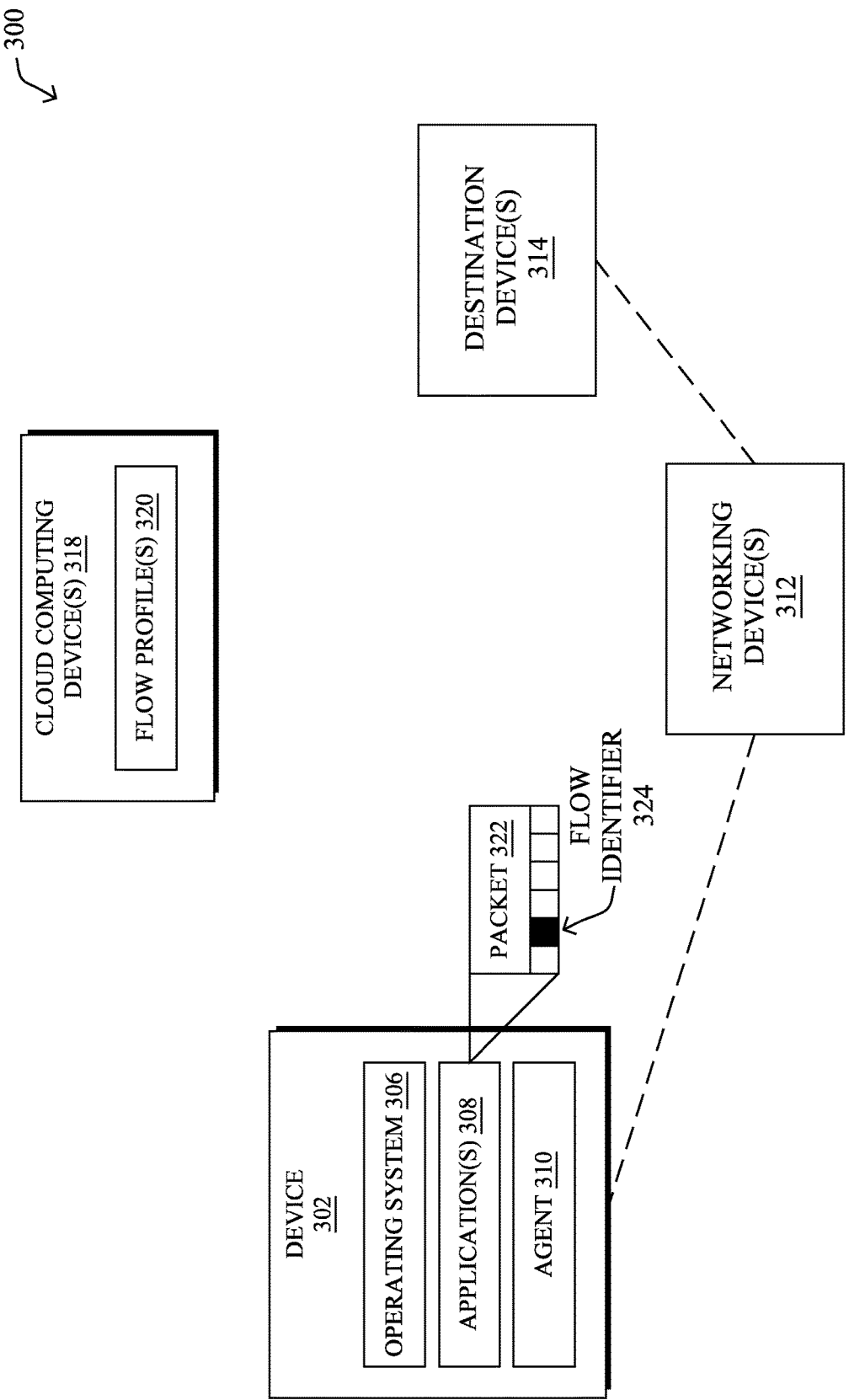

Turning to FIG. 3B, upon execution of application(s) 308 and when application(s) 308 are configured to cause a network packet 322 to be generated, for example, for communication with destination device(s) 312, application(s) 308 may be configured to encode flow profile identifier 324 (associated with the application(s) 308) in network packet 322 (e.g., in a header, payload, etc.). As will be described in greater detail herein below, this encoding may be performed using various techniques, for example, by overloading a DSCP field of network packet 322. Prior to network packet 322 being sent out to destination device(s) 314, agent 310 may be configured to determine, based on the retrieved profile mappings of one or more flow profiles 320, what flow profile is to be applied to network packet 322, where the flow profile includes a definition, instructions, etc. for how the network packet may be prioritized, deprioritized, etc. Such determination may be made by agent 310 matching a particular profiler identifier (indicative of a flow profile) to a corresponding application.

Figure 3C:
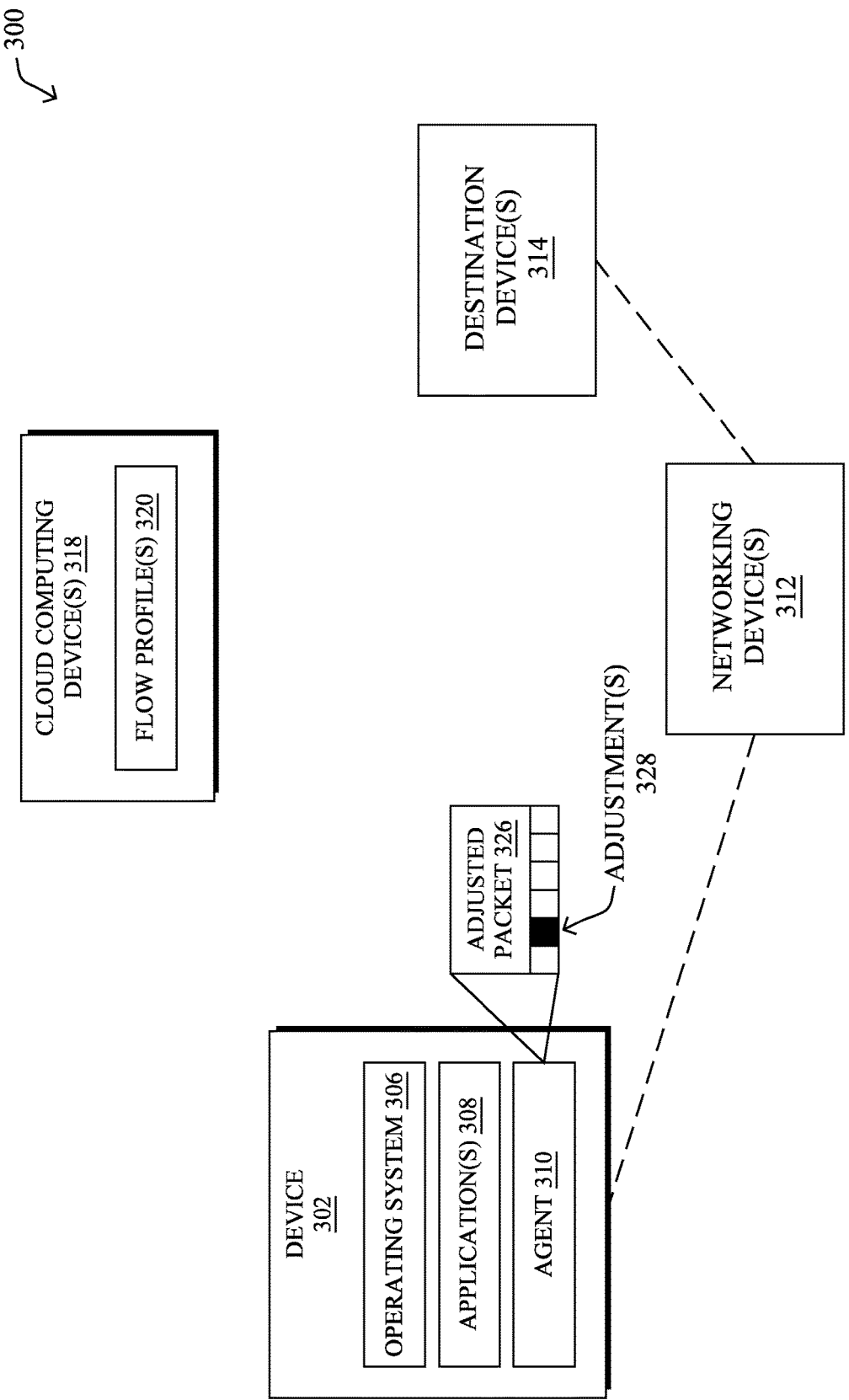

As shown in FIG. 3C, agent 310 may, after determining which flow profile to apply, be configured to form an adjusted packet 326, by removing flow profile identifier 324 from network packet 322. Additionally, agent 310 is configured to replace flow profile identifier 324 with information, values, etc., based on a type of encoding used by application(s) 308. For example, in the case of application(s) 308 overloading a DSCP field, agent 310 may correspondingly reset a value of the DSCP field to an appropriate value in replacement packet header 328. Agent 310 is further configured to, based on the retrieved profile mappings of one or more flow profiles 320, to configure various aspect of adjusted packet 326 such that treatment of the adjusted packet 326 (as part of a network flow to destination device(s) 314) matches definitions and/or requirements of a corresponding flow profile. For example, agent 310 may configure various aspects of flow treatment, such as the transport protocol parameters (e.g., selection of a network transport layer transmission protocol for the packet, for example, user datagram protocol (UDP) or transmission control protocol (TCP)), active queue management (AQM) application and scheduling, packet forwarding strategy, network interface selection (wired LAN, Wi-Fi, Bluetooth, cellular data, etc.), etc.

Figure 3D:
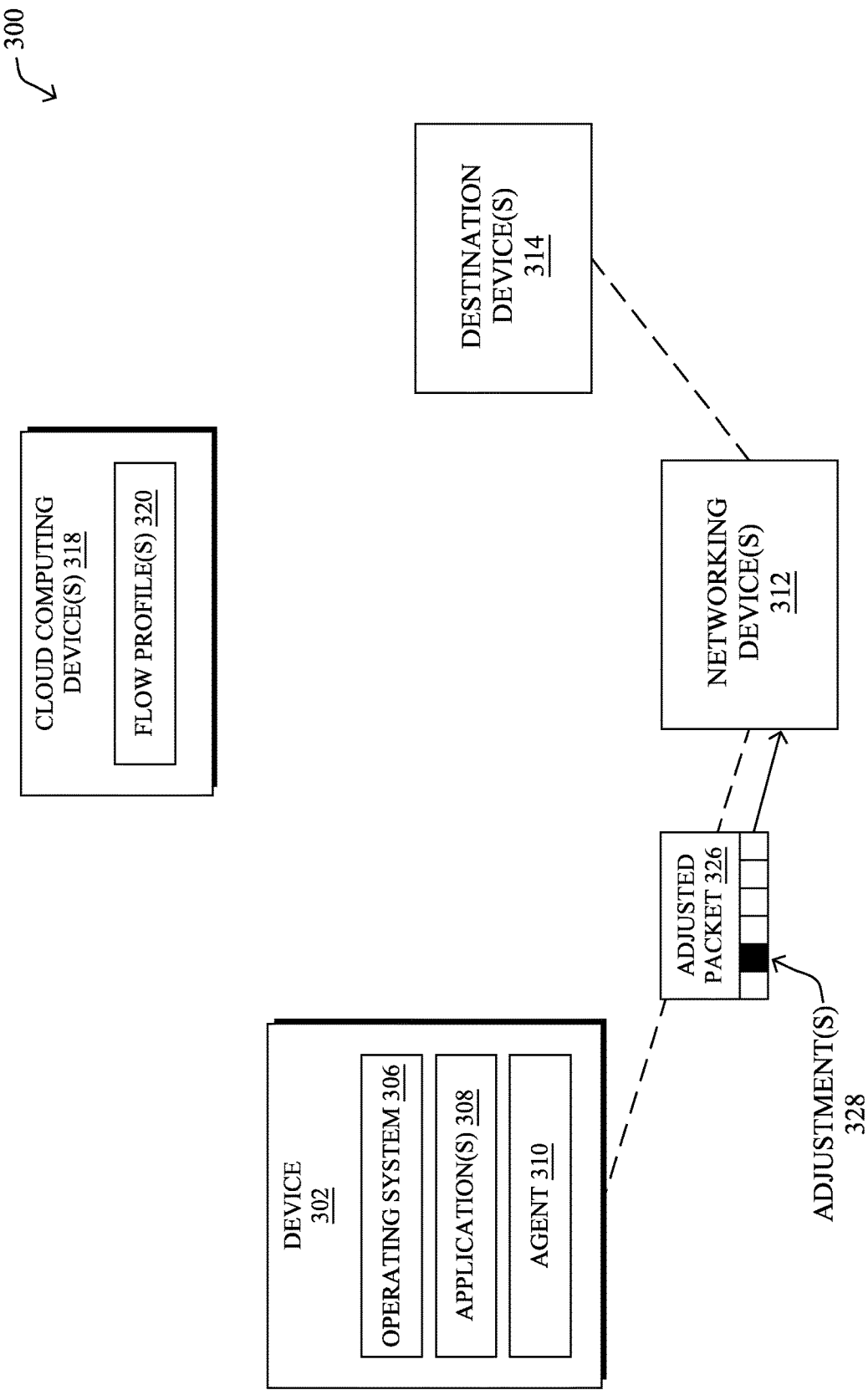

As shown in FIG. 3D, agent 310 may then send adjusted packet 326 towards destination device(s) 314, for example, via networking device(s) 312. Generally, networking device(s) may treat adjusted packet 326 according to flow treatment policy implemented by agent 310. Thus, in an example where application(s) 308 comprises videoconferencing application, different flows by the application may be treated differently (text data versus audio/video data).

According to various embodiments, it is contemplated that application(s) 308 may be configured to encode a flow profile identifier of a network packet using various approaches. One approach may be based on use of an extension and/or payload header of network packet 322, where and additional header may be inserted within a packet payload, while still conforming to size requirements of a single maximum transmission (MTU). Such encoding approach would generally not require additional administration rights/privileges for application(s) 308 and is suited for scenarios where packets of interest are typically small (e.g., real-time and/or interactive network flows by application(s) 308).

Yet another approach, as described herein above, may be based on application(s) 308 resetting layer three fields of network packet 322, for example, by adding one or more sockets options (e.g., a flow label, overloaded DSCP field, etc.). As would be appreciated by one having ordinary skill in the art, such approach does not require agent 310 to perform DPI, does not change a payload size of network packet 322 (so as to avoid requiring agent 310 re-encrypting the packet), and is not bound by MTU size limitations. Generally, such approach requires administrator privileges at application(s) 308, specifically, privileges for adding sockets. Further, such approach would be bound to a size of a particular layer field that is used for indicating a profile identifier (e.g., a DSCP field is six bits long which would enable encoding of up to 64 different profile identifiers).

In another approach, application(s) 308 may communicate a profile identifier with agent 310 using a local socket (when they are co-located on a same device). Such approach may facilitate and/or enable annotations of packet at a granular, per-packet level (e.g. indicate differences among different types of packets like forward error correction (FEC) versus a video packet).

Figure 4:
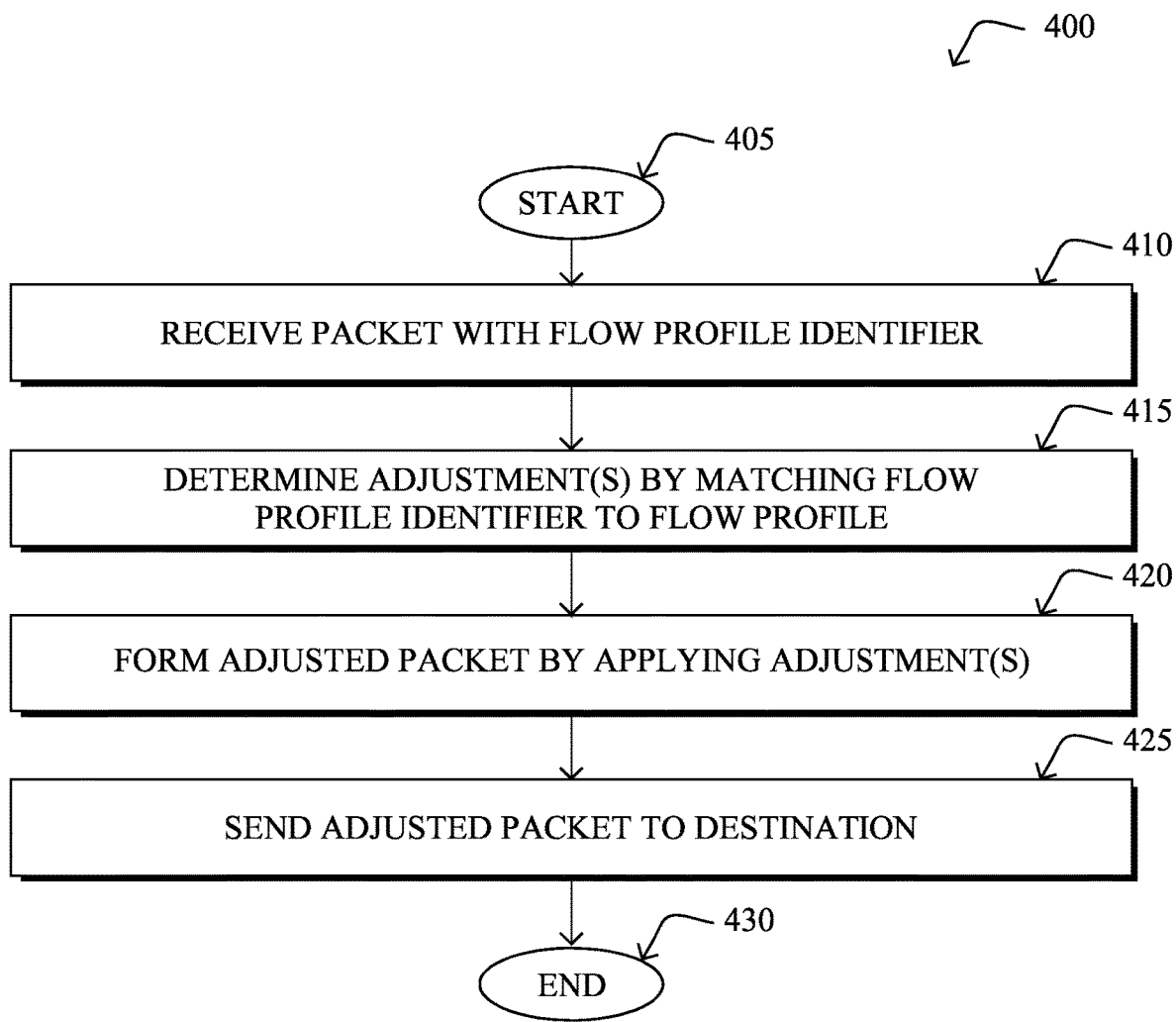
FIG. 4 illustrates an example simplified procedure for network flow differentiation using a local agent.

FIG. 4 illustrates an example simplified procedure (e.g., a method) for network flow differentiation using a local agent, in accordance with one or more embodiments described herein. For example, a non-generic, specifically configured device (e.g., device 200), may perform procedure 400 by executing stored instructions (e.g., flow differentiation process 248). The procedure 400 may start at step 405, and continues to step 410, where, as described in greater detail above, an agent executed by a device may receive a packet generated by an application executed by the device that includes a flow profile identifier. In an embodiment, the flow profile identifier may be encoded in an extension or payload header of the packet. In another embodiment, the flow profile identifier may be encoded in a reset layer three field of the packet. In a further embodiment, the agent may receive the packet from the application via a local socket.

At step 415, as detailed above, the agent may determine one or more adjustments to the packet based in part by matching the flow profile identifier of the packet to a flow profile for the application. In an embodiment, the one or more adjustments to the packet comprise may be removing the flow profile identifier from the packet. Specifically, removing the flow profile identifier from the packet may comprise resetting a differentiated services code point (DSCP) field of the packet. In another embodiment, the one or more adjustments to the packet may comprise selecting a network interface of the device for the packet (e.g., wired LAN over Wi-Fi). In a particular embodiment, the one or more adjustments to the packet may comprise selecting network transport layer protocol for the packet (e.g., UDP or TCP). In yet another embodiment, the one or more adjustments to the packet may comprise determining active queue management (AQM) scheduling for the packet. In a further embodiment, the one or more adjustments to the packet may comprise determining a packet forwarding strategy for the packet.

At step 420, the agent may form an adjusted packet by applying the one or more adjustments to the packet. That is, the agent may form the adjusted packet according to the one or more embodiments, for example, by configuring the adjusted packet to be transmitted by a particular network interface of the device, using a selected network transport layer protocol for the packet etc.

At step 425, as detailed above, the agent may send the adjusted packet to an external destination via a network. Notably, the agent may communicate the adjusted packet according to the one or more adjustments as well as cause the adjusted packet to be sent "upstream" from the device along a path towards a destination for traffic of the application. Procedure 400 then ends at step 430.

It should be noted that while certain steps within procedure 400 may be optional as described above, the steps shown in FIG. 4 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, introduce a mechanism for network flow differentiation using a local agent of a device. That is, the local agent may be executed along with or as part of an application of the device, so as to provide optimal guarantees for network flows, traffic, etc. of the application based on one or more profiles. In order to bring Quality of Experience (QoE) improvements to various flows of a particular application executed on a device (e.g., flows that need to be treated with high priority versus flows that do not), deploying the local agent may be done, for example, within a native quality-aware network stack of the device, by a transparent sidecar proxy, etc. As an example, a videoconferencing application using the local agent described herein, is enabled to communicate how varying network packets of the application are to be treated by upstream networking devices (e.g., by indicating that text-based messaging data is to be de-prioritized and that audio/video data is to be prioritized).

While there have been shown and described illustrative embodiments that provide network flow differentiation using a local agent, it is to be understood that various other adaptations and modifications may be made within the spirit and scope of the embodiments herein. For example, while certain embodiments are described herein with respect to using the techniques herein for certain purposes, the techniques herein may be applicable to any number of other use cases, as well. In addition, while certain types of network packets, protocols, etc. are discussed herein, the techniques herein may be used in conjunction with any network packets, protocols, etc.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
receiving, by an agent executed by a device, a packet generated by an application executed by the device that includes a flow profile identifier associated with a particular flow profile, wherein the particular flow profile is selected by the application from among a plurality of flow profiles for the application and communicates a particular treatment of the packet in a computer network, wherein each of the plurality of flow profiles is unique to the application and indicates a priority level associated with traffic of different flows associated with the application;
determining, by the agent, one or more adjustments to the packet based in part by matching the flow profile identifier of the packet to the particular flow profile for the application;
forming, by the agent, an adjusted packet by applying the one or more adjustments to the packet; and
sending, by the agent, the adjusted packet to an external destination via a network.

2. The method as in claim 1, wherein the one or more adjustments to the packet comprise removing the flow profile identifier from the packet.

3. The method as in claim 2, wherein removing the flow profile identifier from the packet comprises resetting a differentiated services code point (DSCP) field of the packet.

4. The method as in claim 1, wherein the one or more adjustments to the packet comprise selecting a network interface of the device for the packet.

5. The method as in claim 1, wherein the one or more adjustments to the packet comprise selecting network transport layer protocol for the packet.

6. The method as in claim 1, wherein the one or more adjustments to the packet comprise determining active queue management (AQM) scheduling for the packet.

7. The method as in claim 1, wherein the one or more adjustments to the packet comprise determining a packet forwarding strategy for the packet.

8. The method as in claim 1, wherein the flow profile identifier is encoded in an extension or a payload header of the packet.

9. The method as in claim 1, wherein the flow profile identifier is encoded in a reset layer three field of the packet.

10. The method as in claim 1, wherein the agent forms the adjusted packet by replacing the flow profile identifier based on a type of encoding used by the application.

11. An apparatus, comprising:
one or more interfaces;
a processor coupled to the one or more interfaces and configured to execute one or more processes; and
a memory configured to store a process that is executable by the processor, the process when executed configured to:
receive, by an agent, a packet generated by an application executed by the processor that includes a flow profile identifier for a user defined flow profile associated with a particular flow profile, wherein the particular flow profile is selected by the application from among a plurality of flow profiles for the application and communicates a particular treatment of the packet in a computer network, wherein each of the plurality of flow profiles is unique to the application and indicates a priority level associated with traffic of different flows associated with the application;
determine one or more adjustments to the packet based in part by matching the flow profile identifier of the packet to the particular flow profile for the application;
form an adjusted packet by applying the one or more adjustments to the packet; and
send the adjusted packet to an external destination via a network.

12. The apparatus as in claim 11, wherein the one or more adjustments to the packet comprise removing the flow profile identifier from the packet.

13. The apparatus as in claim 11, wherein the one or more adjustments to the packet comprise selecting a network interface of the apparatus for the packet.

14. The apparatus as in claim 11, wherein the one or more adjustments to the packet comprise selecting network transport layer protocol for the packet.

15. The apparatus as in claim 11, wherein the one or more adjustments to the packet comprise determining active queue management (AQM) scheduling for the packet.

16. The apparatus as in claim 11, wherein the one or more adjustments to the packet comprise determining a packet forwarding strategy for the packet.

17. The apparatus as in claim 11, wherein the flow profile identifier is encoded in an extension or a payload header of the packet.

18. The apparatus as in claim 11, wherein the flow profile identifier is encoded in a reset layer three field of the packet.

19. The apparatus as in claim 11, wherein the agent forms the adjusted packet by replacing the flow profile identifier based on a type of encoding used by the application.

20. A tangible, non-transitory, computer-readable medium storing program instructions that cause a device to execute a process comprising:
receiving, by an agent executed by the device, a packet generated by an application executed by the device that includes a flow profile identifier associated with a particular flow profile, wherein the particular flow profile is selected by the application from among a plurality of flow profiles for the application and communicates a particular treatment of the packet in a computer network, wherein each of the plurality of flow profiles is unique to the application and indicates a priority level associated with traffic of different flows associated with the application;
determining, by the agent, one or more adjustments to the packet based in part by matching the flow profile identifier of the packet to the particular flow profile for the application;
forming, by the agent, an adjusted packet by applying the one or more adjustments to the packet; and
sending, by the agent, the adjusted packet to an external destination via a network.

* * * * *